United States Patent
Matscheko

(10) Patent No.: US 6,297,570 B1
(45) Date of Patent: Oct. 2, 2001

(54) ELECTRIC LINEAR MOTOR, IN PARTICULAR THE DESIGN OF THE PRIMARY PART AND A METHOD OF MANUFACTURING THE PRIMARY PART

(75) Inventor: Gerhard Matscheko, Starnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/564,607

(22) Filed: May 4, 2000

(30) Foreign Application Priority Data

May 5, 1999 (DE) .............................. 199 20 700

(51) Int. Cl.⁷ ..................... H02K 41/00; H02K 15/06
(52) U.S. Cl. ................................................. 310/12
(58) Field of Search ........................... 310/12, 13, 14, 310/71; 429/604

(56) References Cited

U.S. PATENT DOCUMENTS 4,626,721 * 12/1986 Ouchi ....................... 310/71
5,625,244 * 4/1997 Bradfield .................. 310/71

* cited by examiner

Primary Examiner—Nestor Ramirez
Assistant Examiner—Judson H. Jones
(74) Attorney, Agent, or Firm—Staas & Halsey LLP

(57) ABSTRACT

A primary part of a linear motor has a terminal compartment at the end of the linear motor for connecting motor windings to feeder cables, with the walls of the terminal compartment being formed from an electric casting compound, and terminal elements being embedded in the casting compound of the terminal compartment, where the terminal elements can be connected to feeder cables. Dividing webs which are also made of the casting compound may extend between the terminal elements in the terminal compartment. To manufacture the primary part, a die having a complementary shape to the terminal compartment to be formed is introduced into a housing before casting and the terminal elements are attached to the die before casting. After casting and curing of the casting compound, the die is removed. The resulting terminal compartment can be closed by a cover through which the feeder cables pass and which functions as a cable grip for the feeder cables.

8 Claims, 2 Drawing Sheets

ELECTRIC LINEAR MOTOR, IN PARTICULAR THE DESIGN OF THE PRIMARY PART AND A METHOD OF MANUFACTURING THE PRIMARY PART

BACKGROUND INFORMATION

Primary parts of linear motors have an array of motor windings which receive electric power from the outside through a feeder cable. There are generally two options for connecting the feeder cables. First, the feeder cable can be connected to the motor windings directly in the interior of the motor; this has the advantage of a very space-saving design. Second, it is conventional in general today to cast the primary parts of linear motors with a casting compound that is cured and provides insulation to prevent leakage currents and relative movements of the motor windings with respect to one another. However, this has the disadvantage that after the casting compound has cured, the terminals of the feeder cable are also cast in the compound and thus are no longer accessible. Thus, the entire primary part is rendered useless if there is damage to the cable, which can occur especially easily if the primary part is used as a moving part.

This can be avoided by mounting a terminal box. The terminal box is an additional terminal housing mounted on the housing or the like outside the primary part and inserted into the motor windings leading out of the primary part and secured on a terminal strip. The actual lead wire is also inserted into the terminal box and connected to the conductors of the motor windings by the terminal strip. This has the advantage that the feeder cable can be replaced easily in the event of damage and the primary part can be used further. On the other hand, this requires more space, additional components and additional assembly steps.

SUMMARY

An object of the present invention is to provide a primary part for a linear motor where the feeder cable is replaceable, has a relatively compact design and can be manufactured easily.

According to the present invention, the terminal elements for the feeder cables are embedded in the casting compound, where the contact parts for assembly of the feeder cables are exposed to the outside. Since the casting compound hardens after being cast, the terminal elements are securely held by the casting compound and are insulated from one another due to the electrical properties of the casting compound. Thus, it is not necessary to place a separate terminal box on the motor.

The electrically conducting terminal elements and/or their contact parts may be designed to advantage as a threaded rod, a bushing with an inside thread, a plug, a socket or the like.

Multiple terminal elements are provided to advantage, with adjacent elements being separated by projecting webs of casting compound. To further improve the mechanical and/or electric properties of the webs, a suitable reinforcing material may be embedded in the material of the webs.

The housing of the primary part may advantageously contain a terminal compartment having walls at least partially defined by the casting compound, with the terminal elements opening into this compartment and/or extending there. Such a terminal compartment can be covered advantageously with a cover which can be bolted to the housing. The feeder cable then advantageously passes through the cover and is secured on the cover as a cable grip.

In a method of manufacturing the primary part according to the present invention, the required motor windings are prepared and introduced into a housing. A die having a shape complementary to that of the terminal area to be created is secured on the housing, where the terminal elements are in turn secured on the die at suitable locations. Then the housing and the die are cast with the casting compound, and if needed, reinforcing material can be attached to the die prior to casting. After the casting compound has hardened, the die can be removed, so the terminal elements are accessible for connecting the feeder cables.

DETAILED DESCRIPTION

Figure 3:
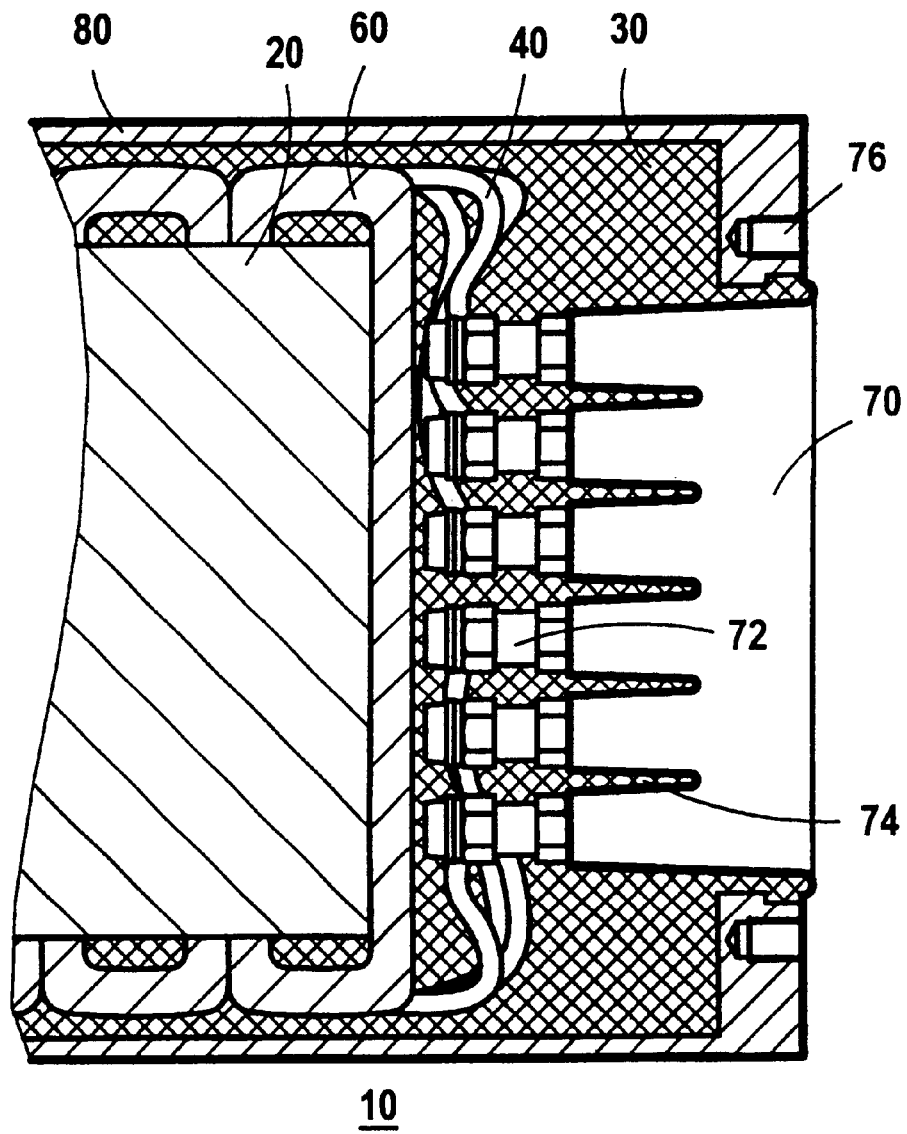
FIG. 3 shows a cross-sectional top view of one end of the primary part according to the present invention.

As shown best in FIG. 3, primary part 10 has a housing 80 in which motor windings 60 and winding cores 20 are accommodated. To this extent, the linear motor corresponds to a conventional linear motor whose design is generally known and will not be explained in greater detail here.

Connecting cables 40 lead from motor windings 60 to terminal elements 72. The entire interior of primary part 10 except for a terminal compartment 70 at one end of the primary part is cast with casting compound 30, so that motor windings 60, winding cores 20 and lead wires 40 are surrounded by casting compound, and terminal elements 72 are embedded in the casting compound so that the actual contact part of the terminal elements is exposed toward the connection of the lead wires with the terminal compartment. In the present case, terminal elements 72 are designed as bushings with an inside thread, so that the lead wires (not shown in FIG. 3) can be attached by using a screw.

In terminal compartment 70, webs 74 are provided between terminal elements 72, separating and electrically insulating the terminal elements.

Terminal compartment 70 can be covered by a cover (not shown), with the feeder cables passing through the cover and being attached to it so that the cover also functions as a cable grip. The cover is in turn secured by suitable fastening means, e.g., by boreholes 76 in the housing.

Figure 1:
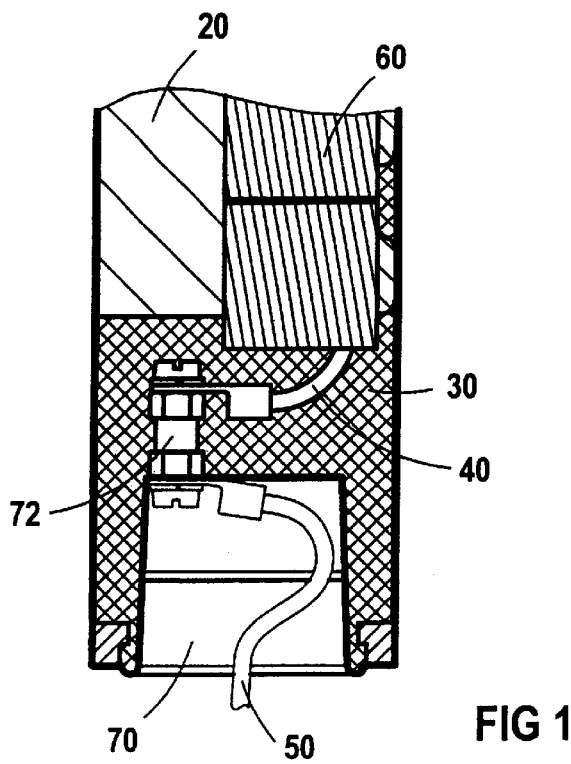
FIG. 1 shows an enlarged sectional diagram of the terminal area of a primary part according to one embodiment of the present invention as seen from the side.

FIG. 1 shows in greater detail a cross section through the terminal area, showing that first, the terminal elements are connected to connecting cables 40 on the one hand and, on the other hand, to a feeder cable 50 extending into the terminal compartment.

Figure 2:
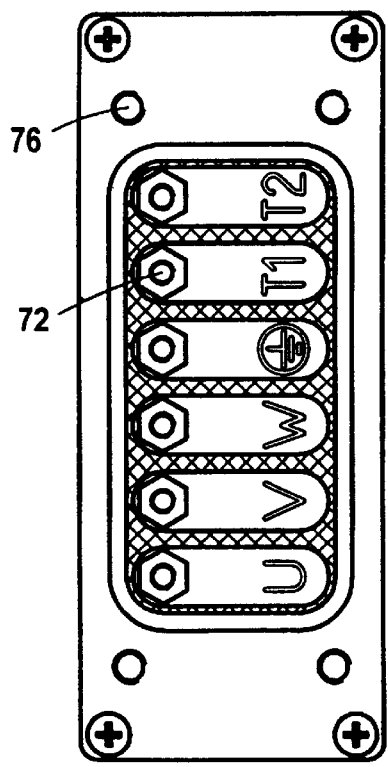
FIG. 2 shows a top view of one end of the primary part according to the present invention.

FIG. 2 shows a top view of one end of the primary part according to the present invention. In the embodiment shown here, an identifier (U, V, W, T1, T2, ground symbol) is assigned to each terminal element 72, indicating how terminal elements 72 are to be connected, i.e., to phases U, V, W of the three-phase alternating current, to the grounding cable and/or to sensor lines T1 and T2. These identifiers can be designed easily by structuring the casting compound, as explained below.

To manufacture the primary part according to the present invention, the prepared motor windings, etc. are introduced into housing 80, and a die (not shown) which is secured on the housing and seals the housing to the outside is inserted in the area of the terminal compartment. The die has a shape complementary to that of terminal compartment 70 to be manufactured and has suitable retaining elements for detachably retaining terminal elements 72. In addition, structures for forming the identifying marks may be mounted on the end face of the die beneath the terminal elements.

After sealing the housing, the housing is filled with casting compound which fills up all the empty spaces in the housing, sheathing motor windings 60 and winding cores 20 as well as the terminal elements and the die. After the casting compound has solidified, the die can be removed, which is additionally facilitated by the fact that the faces of the die (side faces of webs 74 and the walls of terminal compartment 70) extending in the longitudinal direction of the primary part are arranged with an inclination toward the longitudinal direction of the primary part. When the die is removed, the terminal elements are held in position by the solidified casting compound and are thus released from the die. To facilitate the separation of the die from the casting compound, the die can be coated with a suitable parting compound before applying the terminal elements to the die.

The primary part according to the present invention has a relatively compact design because it is lengthened only by the extent of terminal compartment 70. Terminal compartment 70 does not require any additional components or assembly steps, because it is automatically formed in casting the primary part; no additional assembly steps are necessary for a separate terminal box, and the lead wires can be replaced easily, with the cover also functioning as a cable grip.

What is claimed is:

1. A primary part for a linear motor, comprising:
   motor windings cast in casting compound; and
   at least one terminal element having a contact part for connecting the motor windings to a feeder cable, the terminal element being embedded in the casting compound without covering the contact part for connecting the feeder cable with casting compound.

2. The primary part according to claim 1, wherein the terminal element is one of: i) a threaded rod, ii) a bushing with an inside thread, iii) a plug and iv) a socket.

3. The primary part according to claim 1, where the at least one terminal element includes a plurality of terminal elements, adjacent terminal elements being separated by projecting webs.

4. The primary part according to claim 3, wherein reinforcing material is embedded in the webs.

5. The primary part according to claim 1, further comprising:
   a terminal compartment provided on one end of the primary part, the terminal compartment being at least partially surrounded by the casting compound, at least one of: i) the terminal elements extending into the terminal compartment, and ii) the contact parts of the terminal elements being exposed in the terminal compartment.

6. The primary part according to claim 5, further comprising:
   a cover closing the terminal compartment, the cover forming a cable grip for the feeder cable.

7. A linear motor, comprising:
   a primary part, the primary part including
      motor windings cast in casting compound, and
      at least one terminal element having a contact part for connecting the motor windings to a feeder cable, the terminal element being embedded in the casting compound without covering the contact part for connecting the feeder cable with casting compound.

8. A method of manufacturing a primary part of a linear motor, comprising:
   manufacturing motor windings;
   connecting the motor windings to terminal elements;
   attaching the terminal elements to a die;
   casting the motor windings with electric casting compound so that the terminal elements removing the die after the casting compound is cured.

* * * * *